(12) United States Patent
Wijaya et al.

(10) Patent No.: US 8,261,101 B1
(45) Date of Patent: Sep. 4, 2012

(54) SELF POWER DOWN INTEGRATED CIRCUIT

(75) Inventors: Honggo Wijaya, San Jose, CA (US); Patrick J. Crotty, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1100 days.

(21) Appl. No.: 12/059,675

(22) Filed: Mar. 31, 2008

(51) Int. Cl.
*G06F 1/00* (2006.01)
(52) U.S. Cl. ........ 713/300; 713/310; 713/320; 713/321; 713/322; 713/323; 713/324; 713/330; 713/340; 326/38; 326/39; 326/41
(58) Field of Classification Search .................. 713/300, 713/310, 320–324, 330, 340; 326/38, 39, 326/41
See application file for complete search history.

(56) References Cited

U.S. PATENT DOCUMENTS

| | | | |
|---|---|---|---|
| 5,362,989 A | | 11/1994 | Hennedy |
| 6,654,898 B1 * | | 11/2003 | Bailey et al. .................. 713/500 |
| 6,735,183 B2 * | | 5/2004 | O'Toole et al. ............... 370/311 |
| 7,265,605 B1 | | 9/2007 | Vasudevan |
| 7,295,036 B1 * | | 11/2007 | Zaveri et al. .................... 326/38 |
| 7,334,144 B1 * | | 2/2008 | Schlumberger ............... 713/320 |
| 7,376,037 B1 * | | 5/2008 | Law et al. ....................... 365/226 |
| 7,564,727 B1 * | | 7/2009 | Huang ........................... 365/195 |
| 7,583,104 B2 * | | 9/2009 | Simmons et al. ............... 326/82 |
| 7,589,564 B2 * | | 9/2009 | Simmons et al. ............... 326/82 |
| 7,853,811 B1 * | | 12/2010 | Walstrum et al. ............. 713/320 |

OTHER PUBLICATIONS

DS060 (v1.7), "Spartan and Spartan-XL Families Field Programmable Gate Arrays", Jun. 27, 2002, 82 pages, http://www.xilinx.com/support/documentation/datasheets/ds060.pdf, Xilinx, Inc. 2100 Logic Drive, San Jose, CA 95124.
DS529, "Spartan-3A FPGA Family: Data Sheet", Jul. 10, 2007, 116 pages, http://www.xilinx.com/support/documentation/datasheets/ds529.pdf, Xilinx, Inc. 2100 Logic Drive, San Jose, CA 95124.
U.S. Appl. No. 11/498,467, filed Aug. 3, 2006, Walstrum, Jr., James A., et al., entitled, "Suspend Mode Operation for Reduced Power", Xilinx, Inc. 2100 Logic Drive, San Jose, CA 95124.

* cited by examiner

*Primary Examiner* — M Elamin
(74) *Attorney, Agent, or Firm* — Thomas A. Ward; John J. King

(57) ABSTRACT

A suspend mode is provided that can be asserted using an Internal Configuration Access Port (ICAP) of an integrated circuit such as a Field Programmable Gate Array (FPGA), as supposed to a dedicated external suspend pin typically accessed by a device external to the FPGA. The ICAP is designed to assert the suspend mode through a configuration block to maintain the state of the configuration memory array while lowering power, in a similar manner to when an external suspend pin is accessed. Internal circuits can, thus, be used to assert a suspend mode through the ICAP.

13 Claims, 3 Drawing Sheets

SELF POWER DOWN INTEGRATED CIRCUIT

BACKGROUND

1. Technical Field

The present invention relates to a method for powering down an integrated circuit (IC) into a sleep or suspend mode while maintaining the internal state of the IC at wakeup when the system power is restored.

2. Related Art

Integrated circuits (ICs) include devices such as field programmable gate arrays (FPGAs) and Application Specific Integrated Circuits (ASICs). FPGAs are programmable, where programmability enables FPGAs to be purchased by customers and configured to provide a desired circuit. As FPGAs become more complex, they are designed to include features to enable them to emulate more complex ASICs or other components such as microcontrollers or processors.

A feature included in many integrated circuits, such as an FPGA, is a "suspend" mode pin that allows the chip to operate at low power while maintaining its internal state. It is desirable to provide a suspend mode for integrated circuits, such as an FPGA, with further improvements to enable users to easily assert and deassert the suspend mode.

SUMMARY

In accordance with embodiments of the present invention, a suspend mode is provided that can be asserted without requiring a dedicated suspend mode external pin.

In embodiments of the invention, a suspend mode is asserted through the ICAP of an integrated circuit (IC). The ICAP may assert the suspend mode through a configuration block. An internal module can, thus, be used to access the ICAP to assert the suspend mode.

For wakeup from a sleep mode, in some embodiments with the ICAP port powered down during sleep mode, a wakeup signal can still be supplied from a dedicated suspend pin that bypasses the ICAP port and applies a signal directly to the configuration block. Further, wakeup can be accomplished by other signal pins applied directly to the configuration block that bypass the ICAP port. Such wakeup signals can also be provided by an internal watchdog timer connected directly to the configuration block.

For wakeup from a sleep mode with the ICAP port still powered during a sleep mode, in further embodiments of the invention any signal pin external to the IC can be used to both assert and deassert the suspend mode through the ICAP. Wakeup and sleep can similarly both be triggered by an internal module or watchdog timer through the ICAP module.

BRIEF DESCRIPTION OF THE DRAWINGS

Further details of the present invention are explained with the help of the attached drawings in which.

DETAILED DESCRIPTION

The Spartan™ 3A, Spartan 3AN, and Spartan 3A-DSP families of FPGAs manufactured by Xilinx, Inc. of San Jose, Calif. includes such a suspend capability. The suspend capability on these FPGAs can be entered by asserting a dedicated suspend pin on the chip. A microcontroller, or other device external to the FPGA, asserts a signal to the suspend pin input that tells the FPGA to enter suspend mode. Specifics of how the Spartan-3 FPGA asserts a suspend mode is described subsequently with reference to the block diagram of components of a conventional FPGA shown in FIG. 1. Note that while the description herein uses specific examples, such as an FPGA, the techniques and structures may be useful in any integrated circuit having a suspend or power down feature.

Figure 1:
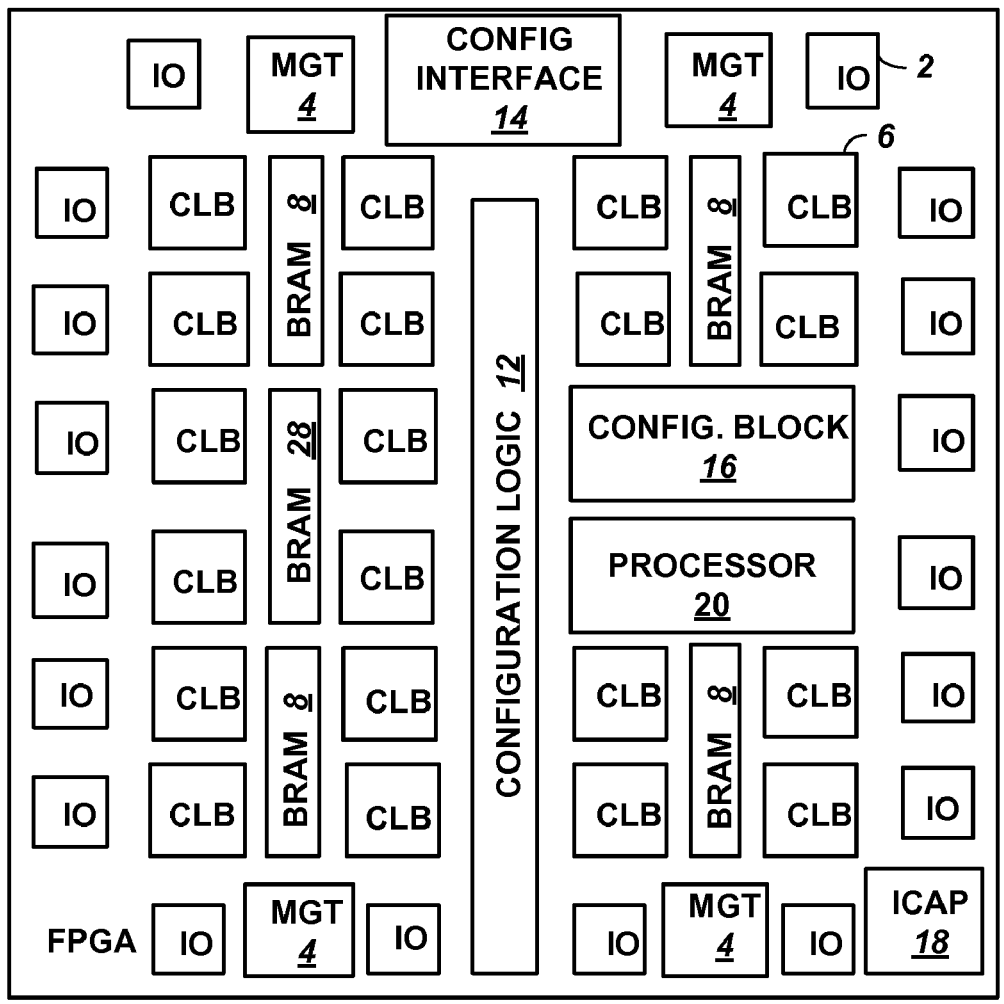
FIG. 1 shows a block diagram of an FPGA.

The FPGA of FIG. 1 includes input/output (I/O) blocks 2 (each labeled 10) located around the perimeter of the FPGA, multi-gigabit transceivers (MGT) 4 interspersed with the I/O blocks 2, configurable logic blocks 6 (each labeled CLB) arranged in an array, block random access memory 8 (each labeled BRAM) interspersed with the CLBs 6, configuration logic 12, configuration interface 14, configuration block 16, an internal configuration access port (ICAP) 18, and an on-chip processor 20. The FPGA also includes other elements, such as a programmable interconnect structure and a configuration memory array, which are not illustrated in FIG. 1. Although FIG. 1 shows a relatively small number of I/O blocks 2, CLBs 6 and block RAMs 8 for illustration purposes, it is understood that an FPGA typically includes many more of these elements. The configuration memory array is programmed to provide a circuit created from the CLBs 6, I/O blocks 2, block RAMs 8, and other interconnect logic.

In general, the FPGA of FIG. 1 is configured in response to a set of configuration data values that are loaded into a configuration memory array of the FPGA from an external store via configuration interface 14, configuration block 16, and configuration logic 12. Configuration interface 14 can be, for example, a parallel select map interface, a JTAG interface, or a master-serial interface. The configuration memory array can be visualized as a rectangular array of bits. The bits are grouped into frames that are one-bit wide words that extend in columns from the top of the array to the bottom. The configuration data values are typically loaded into the configuration memory array one frame at a time from the external store via the configuration interface 14. The frames are read by the configuration block 16, which includes a state machine to decode instructions and control the configuration logic 12 to program the configuration memory array according to the instructions.

The FPGA can be partially reconfigured by rewriting data in the configuration memory array using the ICAP 18. The ICAP 18 has ports accessed internal to the FPGA. Thus, during operation, instructions created within the FPGA can be sent to a port of the ICAP 18 to cause a portion of the configuration memory array to be rewritten, while other portions of the memory array stay programmed to allow the FPGA to continue to function. The ICAP 18 provides instructions to the configuration block 16, in a similar manner to when configuration instructions are provided externally through the configuration interface 14 to the configuration block 16. The instructions from the ICAP 18 are then processed by the state machine of the configuration block 16 to cause the configuration logic 12 to rewrite data in the configuration memory array in order to generate or instantiate the FPGA's internal logic (e.g., CLBs 6 and BRAMs 8). The ICAP 18 can further be used to read the contents of the configuration memory array to verify programming. In other words, a first part of the configured FPGA can cause reconfiguration of another part of the FPGA, while the first part remains operating.

To provide the suspend mode, a suspend pin is asserted external to the FPGA. The suspend mode pin then triggers an interrupt to the configuration block 16. The configuration block 16, processing the suspend interrupt instruction, causes entry into a low power mode while maintaining the current state of the configuration memory array through the configuration logic 12. The configuration block 16 further maintains the current operation state of the FPGA in suspend mode by maintaining a state of registers or flip-flops of the CLBs 6 that are not part of the configuration memory so that all internal states will be maintained. To wake up, a user or microcontroller will deassert a signal supplied to the external SUSPEND pin of the FPGA, causing the configuration block 16 to return the system to a high or higher power level without changing the internal configuration. With the Spartan families of FPGAs, an awake pin can be used to monitor whether the FPGA is still in suspend mode. The awake pin is controlled by the state machine in the configuration block 16 to indicate if the FPGA is in suspend or awake mode.

Figure 2:
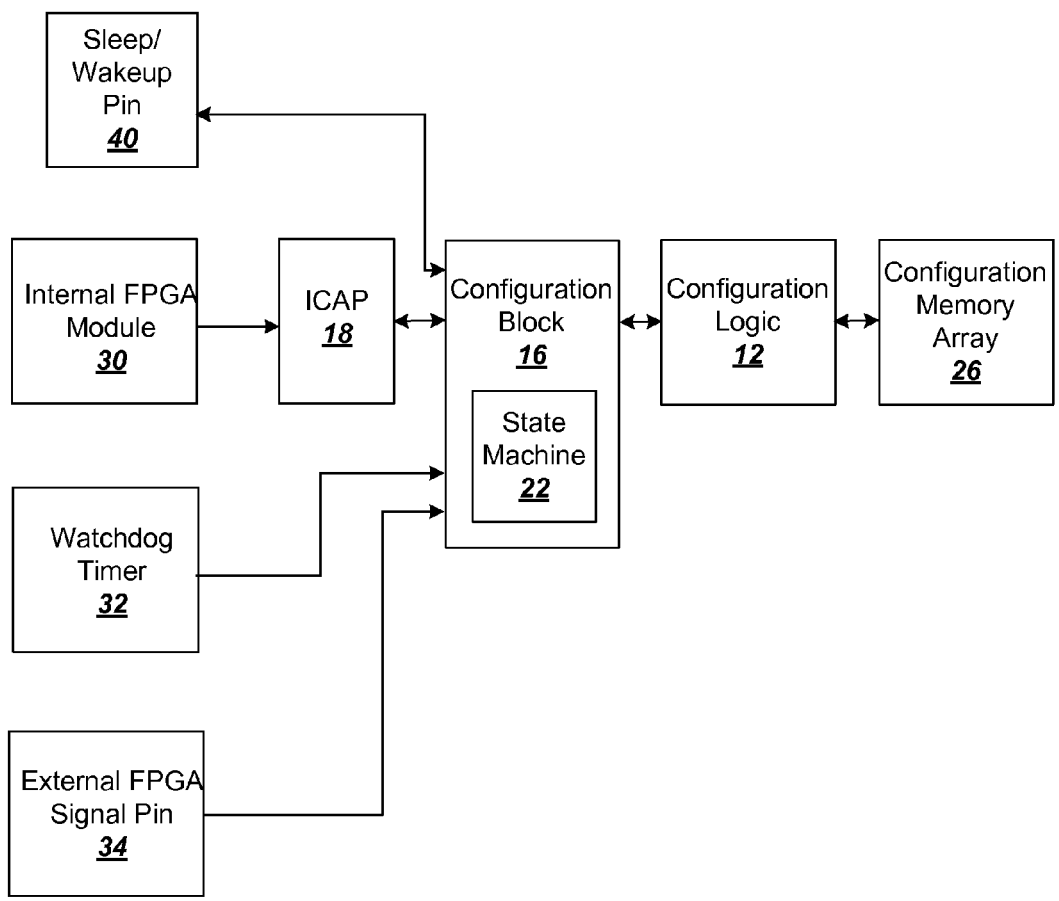
FIG. 2 shows a block diagram of components used in an FPGA for providing a suspend mode using an internal module providing signals to an ICAP according to embodiments of the present invention.

FIG. 2 shows a block diagram of components used in an FPGA for providing a suspend mode according to embodiments of the present invention. The components include an ICAP 18 that can receive a suspend signal or instruction internal to the FPGA. The component shown to provide such a suspend signal to the ICAP is an internal FPGA module 30. The internal module 30 can be any component, such as a component created in the logic of the FPGA, that is capable of generating an instruction or interrupt to provide to the ICAP 18.

The ICAP provides a port access to the configuration block 16. To enable the suspend mode to be activated using an instruction or interrupt from the ICAP 18, the instruction set of the state machine 22 of the configuration block 16 is extended in accordance with embodiments of the present invention. The state machine 22 will thus allow processing of the instruction to cause the configuration block 16 to control the configuration logic 12 to maintain the state of the configuration memory 26. The state machine 22 will further enable the configuration block 16 to preserve the state of registers in the FPGA, separate from the configuration memory 26. Once the state of the configuration memory 26 and other registers is preserved, the state machine 22 of the configuration block 16 will reduce the FPGA power to a low level.

FIG. 2 illustrates that although the internal module 30 can supply a suspend mode signal through the ICAP port, suspend mode can still be provided in some embodiments, for example by using a conventional dedicated suspend pin 40. Similarly, wakeup can be triggered by an external deassertion of the suspend signal at the suspend pin 40 that directly connects to the configuration block 16 to bring the chip back to full power.

In the embodiments illustrated by FIG. 2, the ICAP 18 itself is powered down during sleep mode. With this configuration, a wakeup signal cannot be provided through the ICAP 18 to exit the suspend mode. Wakeup with the ICAP 18 powered down can be provided directly through the configuration block 16 using the conventional external dedicated suspend pin 40.

Besides the dedicated suspend pin 40, FIG. 2 shows other components that can trigger wakeup when the ICAP 18 is powered down in suspend mode. Initially, FIG. 2 shows that a watchdog timer can be included that is directly connected to the configuration block 16 to enable providing both a suspend and a wakeup signal. The watchdog timer 32 can be a programmable timer that asserts and deasserts the suspend mode after desired periods of time. In one embodiment an internal module 30 can be programmed to form a watchdog timer, such as watchdog timer 32, and assert the suspend mode through the ICAP 18. With assertion of the suspend mode through the ICAP 18 by the internal module 30, however, a separate device will be needed in this embodiment to directly connect to the configuration block 16 to wakeup the chip.

FIG. 2 further illustrates connection of external pins 34, other than a dedicated suspend pin 40 that can provide for wakeup from a suspend mode with the ICAP 18 powered down during a suspend mode. The external pins 40 can be any signal pins that are connected to the configuration block 16. A signal from one of the external pins 40 will provide or trigger an interrupt recognized by the configuration block 16 to cause the chip to power up from the suspend mode.

Figure 3:
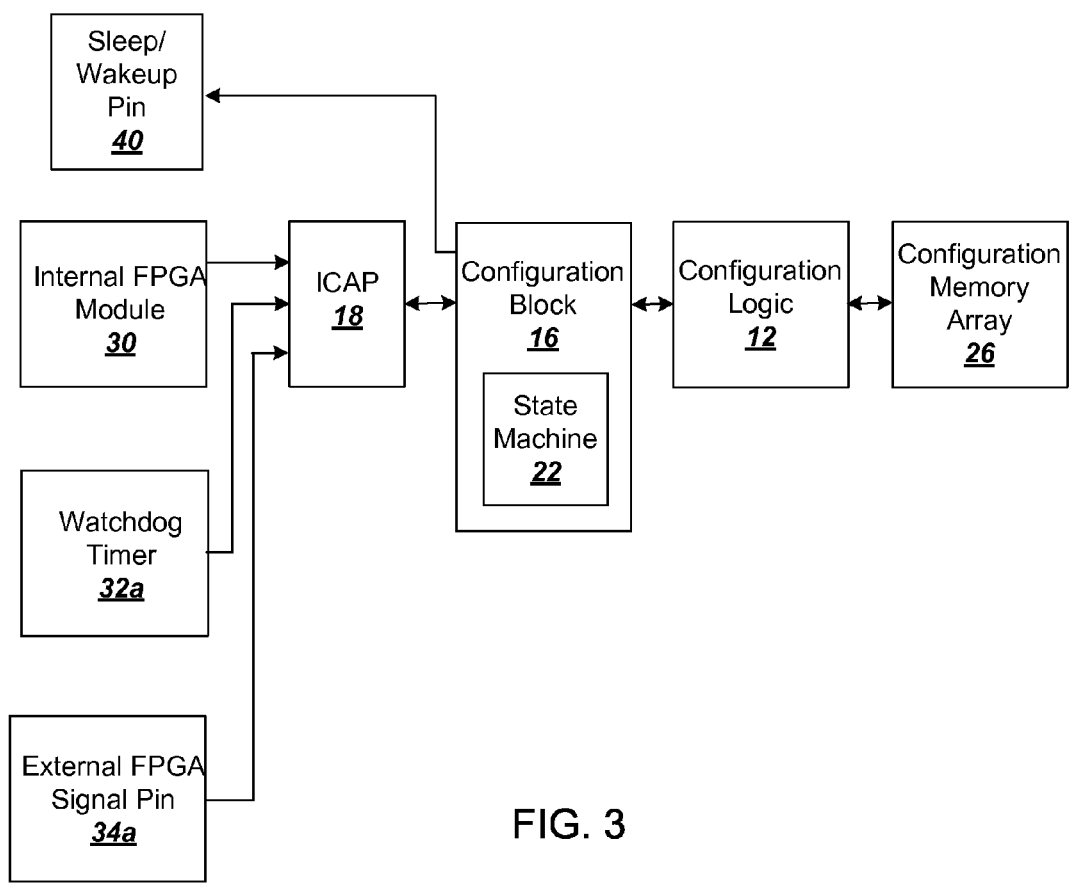
FIG. 3 shows a block diagram of components used in an FPGA for providing both suspend and wakeup through an ICAP that is powered during a suspend mode according to embodiments of the present invention.

FIG. 3 shows a block diagram of components for some embodiments of the invention where the ICAP 18 does not power down during suspend mode. First, a watchdog timer 32a is provided that connects through the ICAP 18 to the configuration block 16, rather than directly to the configuration block 16. The watchdog timer 32a can have one or more programmable time period to both assert and deassert the suspend mode. Second, one or more external signal pins 34a can provide both a suspend instruction and a wakeup instruction through the ICAP 18 to configuration block 16. Unlike the dedicated suspend of previous FPGAs, the signal pins 34a can be any signal pin of the FPGA. Both the watchdog timer 32a and signal pins 34a can in this embodiment deassert the suspend mode through the ICAP 18 since the ICAP 18 will not be powered down.

In either the system of FIG. 2 or 3, to determine if the suspend mode is activated with the ICAP 18 used according to the present invention, the pin 40 on the FPGA can be monitored to determine the suspend or awake state of the chip similar to previous systems where suspend mode is provided through a dedicated pin. Thus, the pin 40 is shown connected directly to the configuration block 18 to receive an indication of the FPGA state. For example, a watchdog timer can monitor state of the FPGA and can provide a suspend instruction when the FPGA does not change states for a programmed time period.

Although the present invention has been described above with particularity, this was merely to teach one of ordinary skill in the art how to make and use the invention. Many additional modifications will fall within the scope of the invention, as that scope is defined by the following claims.

What is claimed is:

1. A method for providing a suspend mode in an integrated circuit (IC) comprising:
   providing a suspend instruction to an internal configuration access port (ICAP) of the IC, wherein the ICAP provides access to a configuration block to enable writing data in a configuration memory;
   decoding the suspend instruction in the configuration block;
   preserving a configuration memory state of the IC after decode of the suspend instruction to prepare for a low power mode;
   preserving an internal register state of the IC after decode of the suspend instruction to prepare for a low power mode;
   entering the low power mode after decode of the suspend instruction, wherein the ICAP is powered down in the low power mode;
   providing a wakeup signal to the configuration block of the IC; and entering a high power mode in response to the wakeup signal while maintaining the configuration memory state and the internal register state of the IC.

2. The method of claim 1, wherein the suspend instruction is generated by a watchdog timer having a programmable time period, wherein the suspend instruction is provided when the IC does not change states for the programmable time period.

3. The method of claim 1, wherein the suspend instruction is provided by circuitry forming a module provided in the IC.

4. The method of claim 1, wherein the suspend instruction can be provided from a plurality of signal pins of the IC.

5. The method of claim 1, wherein the suspend mode is decoded by a state machine of the configuration block, and wherein the configuration block controls configuration circuitry to maintain the state of the configuration memory.

6. A method for providing a suspend mode in an integrated circuit (IC) comprising:
   providing a suspend mode interrupt signal to an internal configuration access port (ICAP) of the IC, wherein the ICAP provides access to a configuration block to enable writing data in a configuration memory;
   identifying the suspend mode interrupt signal in the configuration block;
   maintaining a configuration memory state and an internal register state of the IC using the configuration block after identification of the interrupt signal, while entering a low power mode, wherein the ICAP is powered down in the low power mode;
   providing a wakeup signal to the configuration block of the IC; and
   entering a high power mode in response to the wakeup signal while maintaining the configuration memory state and the internal register state of the IC.

7. The method of claim 6, wherein the suspend mode interrupt signal is provided by circuitry forming a module provided in the IC.

8. The method of claim 6, wherein the suspend mode interrupt signal is provided from a plurality of signal pins of the IC.

9. An integrated circuit (IC) comprising:
   a configuration memory array;
   configuration circuitry for programming of the configuration memory array;
   a configuration block including a state machine to control configuring of the configuration memory array using the configuration circuitry, the state machine adapted to process a suspend instruction to cause the state of the configuration memory array to be maintained and then cause the IC to enter a low power mode; and
   an internal configuration access port (ICAP) provided internal to the IC for providing the suspend mode instruction to the configuration block;
   wherein the ICAP is powered down in the low power mode; and
   wherein the state machine of the configuration block is further adapted to process a wakeup instruction to cause the IC to enter a high power mode while preserving the state of the configuration memory array.

10. The IC of claim 9, wherein the port comprises an internal configuration access port (ICAP).

11. The IC of claim 9, further comprising:
   a watchdog timer having a programmable time period for providing a suspend instruction when the IC does not change states for the programmable time period.

12. The IC of claim 9,
   wherein the port provided internal to the IC further provides the suspend mode instruction to the configuration block.

13. The IC of claim 9, wherein the suspend mode instruction can be provided from a plurality of signal pins of the IC.

* * * * *